(12) United States Patent
Sagi-Dolev et al.

(10) Patent No.: US 11,544,533 B2
(45) Date of Patent: *Jan. 3, 2023

(54) NETWORK OF INTELLIGENT MACHINES

(71) Applicant: QYLUR INTELLIGENT SYSTEMS, INC., Palo Alto, CA (US)

(72) Inventors: Alysia M. Sagi-Dolev, Palo Alto, CA (US); Alon Zweig, Tel Aviv (IL)

(73) Assignee: Qylur Intelligent Systems, Inc., Sunnyvale, CA (US)

( * ) Notice: Subject to any disclaimer, the term of this patent is extended or adjusted under 35 U.S.C. 154(b) by 425 days.

This patent is subject to a terminal disclaimer.

(21) Appl. No.: 16/741,551

(22) Filed: Jan. 13, 2020

(65) Prior Publication Data

US 2020/0226448 A1 Jul. 16, 2020

Related U.S. Application Data

(63) Continuation of application No. 13/843,784, filed on Mar. 15, 2013, now Pat. No. 10,534,995.

(51) Int. Cl.
*G06N 3/04* (2006.01)
*G06K 9/62* (2022.01)
(Continued)

(52) U.S. Cl.
CPC ......... *G06N 3/0454* (2013.01); *G06K 9/6262* (2013.01); *G06K 9/6274* (2013.01);
(Continued)

(58) Field of Classification Search
CPC .... G06N 3/0454; G06N 5/043; G06K 9/6262; G06K 9/6274
See application file for complete search history.

(56) References Cited

U.S. PATENT DOCUMENTS 5,845,002 A 12/1998 Heck et al.
7,739,207 B2 6/2010 Biazetti et al.
(Continued)

FOREIGN PATENT DOCUMENTS

CN 102461071 A 5/2012
JP 2003316746 A 11/2003
(Continued)

OTHER PUBLICATIONS

"Canadian Application Serial No. 2,903,041 First Examiner Report dated Feb. 10, 2020" 5 pgs.
(Continued)

*Primary Examiner* — Kevin W Figueroa
(74) *Attorney, Agent, or Firm* — Innovation Counsel LLP

(57) ABSTRACT

An apparatus in a network of apparatuses includes a first processing unit that has: a first measurement unit configured to receive items and take physical measurements, a first memory storing parameters that are useful for categorizing the items based on the physical measurements taken from the items and characteristics calculated using the physical measurements, and a first processing module including an artificial intelligence program. The first processing module automatically selects a source from which to receive new parameters based on similarity between physical measurements taken by the first processing unit and physical measurements that were taken by the sources, automatically modifies at least some of the parameters that are stored in the first memory with the new parameters received from the source and with measurements taken by the first processing unit to generate modified parameters, and transmitting a subset of the modified parameters to one or more recipients.

16 Claims, 15 Drawing Sheets

(51) Int. Cl.
 G06N 5/04 (2006.01)
 G06V 20/52 (2022.01)
 G06V 20/68 (2022.01)

(52) U.S. Cl.
 CPC ............. *G06N 5/043* (2013.01); *G06V 20/52* (2022.01); *G06V 20/68* (2022.01)

(56) References Cited

U.S. PATENT DOCUMENTS

| | | |
|---|---|---|
| 2010/0002604 A1 | 1/2010 | Melick et al. |
| 2010/0315207 A1 | 12/2010 | Bullard et al. |
| 2011/0179052 A1 | 7/2011 | Sato |
| 2012/0197823 A1 | 8/2012 | Hawkins et al. |
| 2012/0330885 A1 | 12/2012 | Jaros et al. |
| 2014/0033819 A1 | 2/2014 | Loeser et al. |

FOREIGN PATENT DOCUMENTS

| | | |
|---|---|---|
| JP | 2011145958 A | 7/2011 |
| RU | 72084 U1 | 3/2008 |

OTHER PUBLICATIONS

Search Report corresponding to RU2015139090, dated Feb. 15, 2018, 2 pages.

Valera, Maria, and Sergio A. Velastin, "Intelligent distrubuted surveillance systems: a review", IEE Proceedings-Vision, Image and Signal Processing 152.2 (2005): 192-204.

Dean, Jeffrey et al., "Large scale distributed deep networks", Advances in Neural Information Processing Systems, 2012.

Huang, Cheng-Lung, and Jian-Fan Dun, "A distributed PSO-SVM hybrid system with feature selection and parameter optimization" Applied Soft Computing 8.4 (2008): 1381-1391.

Carpenter, Gail A., and Stephen Grossberg, "A massively parallel architecture for a self-organizing neural pattern recognition machine", Computer vision, graphics and image processing 37.1 (1987): 54-115.

Nicola Bicocchi et al., "Pervasive Self-Learning with Multi-Modal Distributed Sensors", 2008 Second IEEE International Conference on Self-Adaptive and Self-Organizing Systems Workshops, 6 Pages.

Burga Gedik et al., "ASAP: An Adaptive Sampling Approach to Data Collection in Sensor Networks", IEEE Transactions on Parallel and Distributed Systems, vol. 18, No. 12, Dec. 2007, pp. 1766-1783.

Eduardo F. Nakamura et al., "Information Fusion for Wireless Sensor Networks: Methods, Models and Classifications", ACM Computing Surveys, vol. 39, No. 3, Article 9, Aug. 2007, 55 pages.

Hannah, et al., "Decisions in Condition Monitoring—An Examplar For Data Fusion Architecture", Manchester School of Engineering University of Manchester, ISIF 2000, 8 Pages.

International Search Report, corresponding to PCT/US2014/019134, dated Oct. 28, 2014, 4 pages.

NETWORK OF INTELLIGENT MACHINES

CROSS-REFERENCE TO RELATED APPLICATION

This application is a Continuation application of U.S. patent application Ser. No. 13/843,784 filed on Mar. 15, 2013 (now issued as U.S. Pat. No. 10,534,995), the content of which is incorporated by reference herein.

FIELD OF INVENTION

The present disclosure relates generally to a system for processing data obtained from a plurality of intelligent machines and particularly for machines that change their internal states based on input that is shared between machines.

BACKGROUND

Today, computerized machines are used to perform tasks in almost all aspects of life, such as handling purchases at store checkout stands, and taking and tracking orders at Internet shopping sites, packaging and sorting merchandise, keeping track of inventory in warehouses, tracking automobile registration data, medical screening for various conditions, and detecting the presence of certain objects or conditions. In some instances, there is a single machine that handles all the transactions or activities for that organization. However, in most cases, there are many machines at different locations handling similar tasks. For example, hospitals may have different campuses with a number of MRI machines in different parts of the campuses. Similarly, grocery store chains may have many stores and warehouses across a large geographical area, each store having a number of checkout registers. Likewise, farmers and orchards may each have their own facilities to automatically sort their produce, like sorting apples into high and low grade. Such sorting machines are often based on the appearance of the product, like in the case where a video camera is used to identify bad fruits based on an automatic classifier.

There is an inefficiency stemming from the fact that the different machines are run and updated separately and independently from one another. While a huge amount of data is collected by each machine, the different machines are unable to "coordinate" with each other or learn from each other. Although the machines often have human operators attending to them to deal with any unusual situations or malfunctions, each of the operators only know what is happening with the subset of machines that he is in charge of, and does not benefit from the data in other machines. This lack of communication and shared newly learned features between machines creates inefficiency and redundancy that result in errors. In one instance, a shopper looking for a specific item may have no quick and easy way of knowing which nearby stores carry the item he is looking for. In this kind of situation, much time is wasted by the shopper finding out the phone numbers and calling each of the nearby stores to do a stock check. In another instance, a medical diagnostic machine that has few patients with fractures and utilizes its original core detection algorithm would remain with same detection capability for a long time, keeping it inferior to a diagnostic machine located at a sports medicine center that would continuously get smarter from being exposed to larger samples of such fractures. In yet another instance involving produce classification machines, an operator would have to adjust each machine individually to make sure it weeds out produce with a certain new condition that would be unappealing to customers. In yet another instance involving object detection machines scanning employees' bags for prohibited items (e.g., alcohol, cigarettes) bags of an employee from a town whose lunches contain items that are unique to that area might get misinterpreted as a bag with a prohibited content, because the machine at corporate headquarters is unaware of bag content types of other towns.

An intelligent system that eliminates the inefficiency and redundancy and increases the accuracy by allowing machines to coordinate, communicate, and learn from each other is desired.

SUMMARY

In one aspect, the disclosure pertains to a self-updating apparatus in a network of apparatuses that is configured to characterize items or conditions. The apparatus includes: a first processing unit that includes a first measurement unit configured to receive items and take physical measurements of the items, a first memory storing parameters for the items, wherein the parameters are useful for categorizing the items based on the physical measurements taken from the items and characteristics calculated using the physical measurements, and a first processing module including an artificial intelligence program. The first processing module automatically selects a source from which to receive new parameters, wherein the first processing module selects the new parameters to receive based on similarity between physical measurements taken by the first processing unit and physical measurements that were taken by the sources, automatically modifies at least some of the parameters that are stored in the first memory with the new parameters received from the source and with measurements taken by the first processing unit to generate modified parameters, and transmits a subset of the modified parameters to one or more recipients. At least one of the source and the recipients is a second processing unit that includes a second measurement unit configured similarly to the first measurement unit, a second memory, and a second processing module configured similarly to the first processing module.

In another aspect, the disclosure pertains to a non-transitory computer-readable storage medium storing instructions for categorizing items or conditions. The non-transitory computer-readable storage medium includes: instructions to receive items and take physical measurements of the items, instructions to store parameters in a first memory, wherein the parameters are useful for categorizing the items based on the physical measurements taken from the items and characteristics calculated using the physical measurements, instructions to automatically select a source from which to receive new parameters, wherein the first processing module selects the new parameters to receive based on similarity between physical measurements taken by the first processing unit and physical measurements that were taken by the sources, instructions to automatically modify at least some of the parameters that are stored in the first memory with the new parameters received from the source and with measurements taken by the first processing unit to generate modified parameters, and instructions to transmit a subset of the modified parameters to one or more recipients, wherein at least one of the sources and the recipients includes a measurement unit configured to receive items and take physical measurements of the items, a second memory to store parameters, and a processing module that automatically selects a source from which to receive a different set of parameters and modify at least some of the parameters that are stored in the second memory with the different parameters.

DETAILED DESCRIPTION

Embodiments are described herein in the context of machines that classify fruits according to their grades. However, it is to be understood that the embodiments provided herein are just examples and the scope of the inventive concept is not limited to the applications or the embodiments disclosed herein. For example, the system of the disclosure may be useful for any type of equipment that is capable of automatically learning rules from examples (machine learning algorithms), including but not limited to a machine that employs artificial neural network and is capable of iterative learning, such as medical diagnostic machines, fault testing machines, and object identification machines.

As used herein, "remotely located" means located in different forums, companies, organizations, institutions, and/or physical locations. Machines that are located on different floors of the same building, for example, could be remotely located from each other if the different floors host different organizations. A "processing unit," as used herein, includes both a central processing unit (20) and a machine (30) or a group of machines (50). "Parameters," as used herein, include central parameters and internal parameters.

The system of the disclosure is useful for coordinating information exchange among a plurality of machines. This disclosure discusses a network of machines in communication with each other, which examines the collective body of data from the different machines to generate and modify a set of central parameters. The machines may be remotely-located from the central processing unit and in different places around the world. By being networked, the different machines can learn from one another and utilize the "knowledge" gained from different machines to teach and improve its counter parts. For example, where the machines are fruit-sorting machines, the machines may learn and adjust to a trend that a new condition affecting citrus fruits is showing up at different locations around the world. The central processing unit may be able to either figure out a way to detect this condition based on this data, or utilize the adjusted updated local central parameters in that machine, determine which geographical locations are susceptible to this condition, and transmit information and new central parameters to the machines in these locations that will help detect this new condition so the fruits with the new defect can be rejected.

The central processing unit sees and analyzes the data from a high level using a global network of detection machines. Hence, the system of the disclosure allows an intelligent, better-informed understanding of a situation that cannot be provided by individual machines alone.

Figure 1:
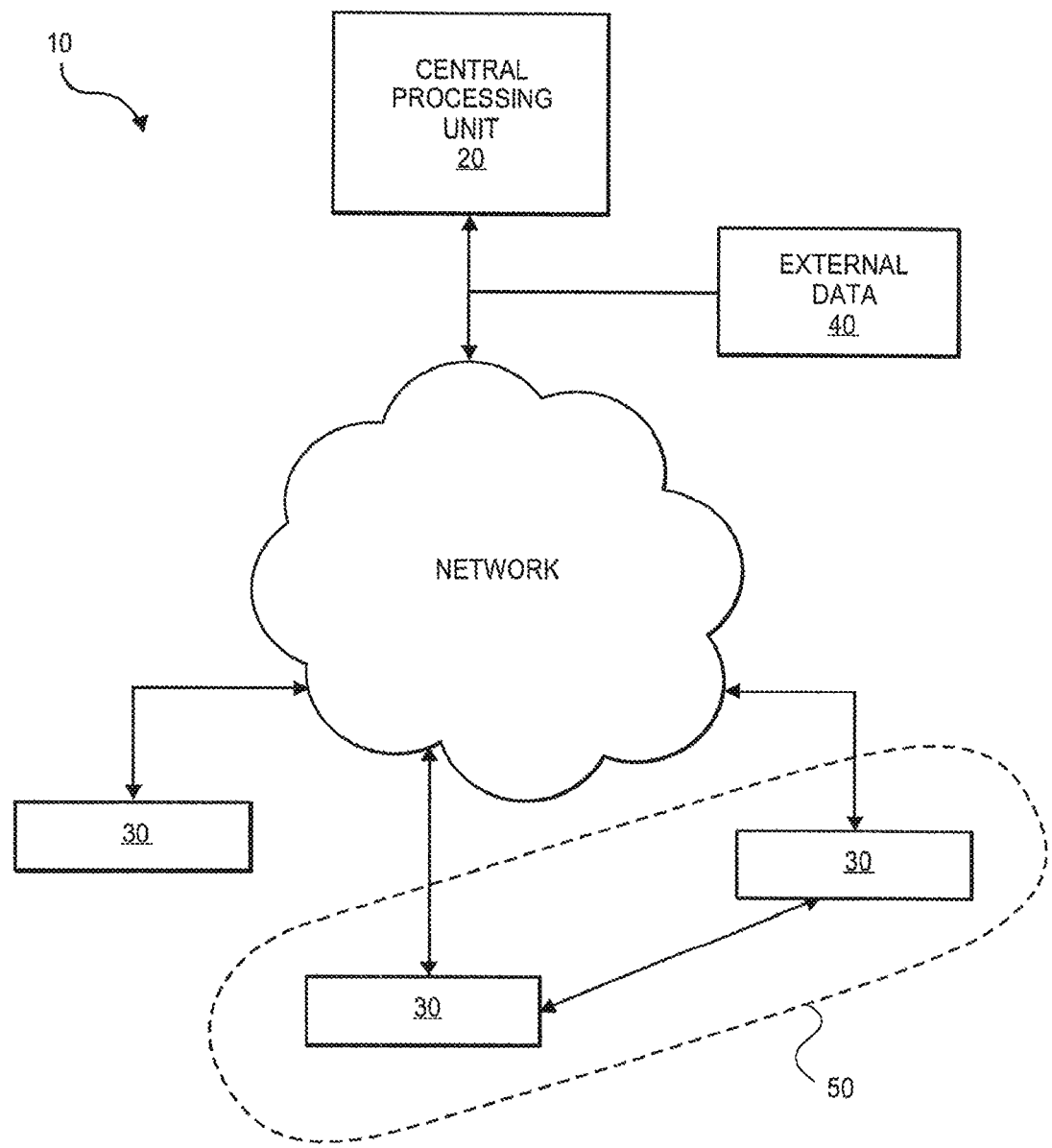
FIG. 1 depicts a machine network system that includes a plurality of machines that communicate with each other and with a central processing unit.

FIG. 1 depicts a machine network 10 that includes a central processing unit 20 in communication with a plurality of machines 30 via a network. The central processing unit 20 is configured to receive and selectively transmit information to the machines 30. Each machine 30 may be one machine unit or a group of units, and typically includes hardware components for receiving items to be tested. In some cases, a plurality of machines 30 are grouped to form a "group" or "family" 50 of machines 30 that directly share data among themselves without going through the central processing unit 20. Machines 30 in a family 50 of machines often have a commonality, such as presence in a same general geographic region, configuration to handle specific fruit types (e.g., citrus fruit), or representing the same company. The machines 30 test each item that is received and characterizes the item according to a set of internal parameters. For example, in the case of fruit-sorting machines, the machine 30 may characterize each fruit as "reject," "juice," "Grade B," and "Grade A." The machines 30 are configured to transmit data to the central processing unit 20, which collects data from all the machines 30 and develops its own central parameters. In one embodiment, the central processing unit 20 initially receives data from the machines 30 to self-train and generate its own set of central parameters. As more data is received, the central processing unit 20 refines and modifies its central parameters such that accuracy and breadth of the characterization is enhanced over time.

The machine 30 would typically be used to characterize an item, for example by detecting the presence of a condition. The machine 30 may be a fruit sorting machine, a detection machine, a store checkout machine, a medical diagnostic machine, a fault detection machine etc. The inventive concept is not limited to being used with any particular type of machine. For example, the machine 30 could be part of a security check system at the entrance of a high-tech manufacturing facility, in which case it could be used to detect the presence of any digital storage devices that may be used for misappropriating intellectual property or technical data. A machine at the entrance/exits of stores could be used to detect stolen merchandise. A fault detection machine could detect micro cracks in air plane wings, and a medical diagnostic device could detect types of cancer, fractures or other conditions. A fruit sorting machine would detect bruises or damage on the fruit. If the presence of a target item is detected, an alarm will be generated to invite an operator who can confirm the presence of the target item/condition, or to activate an automatic response such as locking the undesired object, re-directing it to a trash bin, opening a repair ticket, or placing a comment in a medical file.

Different machines encounter different items and conditions, are exposed to different information, and may learn and develop different classification/characterization rules. Hence, each machine 30 has a unique set of strengths and weaknesses. Each machine 30 sends data to other machines 30 and the central processing unit 20 and receives information from other machines 30 and the central processing unit 20. The communication between different machines as well as between the machines 30 and the central processing unit 20 can be achieved through any secure network using a predetermined protocol.

A processing unit (e.g., a machine 30) determines which data should be sent to which other processing units based on data comparison among the machines 30. For example, if data comparison reveals that Machine X has encountered items that Machine Y has not encountered yet, Machine X may transmit parameters for the items that Machine Y has not encountered to Machine Y, so that Machine Y will recognize the item when it first encounters the item. In another example, where a fig sorting machine 30 and an orange sorting machine 30 compare data with each other and other machines 30, the fig sorting machine and the orange sorting machine may notice that some of the other machines sort objects that are generally round and share similar characteristics as figs and oranges. They may transmit data to those machines and perhaps obtain parameters from those machines, so that both sets of machines can distinguish between figs, oranges, and other items. Even if the fig sorting machine has never countered an orange directly, it will be able to recognize an orange if one were to be received by it because it learned the orange parameters from the orange sorting machine.

In another example, a security check machine in Building A may frequently encounter USB devices carried by employees. A security check machine in Building B, on the other hand, may not have encountered USB devices from its employees and customers. Upon comparison of items between the machines at Building A and Building B, the machine at Building A may send parameters for USB devices to the machine at Building B. If a third machine at Building C already has its own parameters for USB devices, machines at Buildings A and C may compare their internal parameters and make any updates to further refine the parameters.

As explained, the machines and processing units can "learn" from each other by comparing and updating their parameters. In some cases, parameters that are missing in one processing unit are added by being received from another processing unit. In other cases, parameters that are different yet identify the same item triggers the processing units to modify one or more sets of parameters to strengthen the characterization capability.

In one embodiment, each machine 30 or a group of machines 30 incorporates an artificial intelligence program and is able to learn or change their internal states based on input. For example, the machines 30 may learn about ordinary items as more items pass through it. The machines may, for example, incorporate a neural network. In the beginning, the synaptic weights and thresholds of the neural network are initialized and a first set of items are introduced to the machines to receive an output. For example, where the machines 30 are fruit-sorting machines, the output would be a classification assigned to each fruit (e.g., Grade A, Grade B, juice, reject). A machine trainer will initially feed a randomly mixed batch of fruits to the machine 30 and provide input as to how each fruit is categorized, thereby "training" the machine 30. This type of machine training is well known. The machine 30, by using the measurements and the outcomes that each set of measurements was supposed to produce, generates a set of conditions for identifying how a fruit should be categorized. The machine runs tests on the items, makes measurements, and generates a set of parameters for each item. Each machine has a storage unit that records the parameters of all the items it encountered. After the initial training with a set of fruits, each machine has a set of internal parameters that it uses to characterize the next fruit that is received. The more fruits a machine 30 or a group of machines 30 has seen, the more data points it will have in its memory and the more accurate the next characterization will be. The internal parameters are continually modified to enhance the accuracy of characterization.

In one embodiment, each machine 30 transmits the parameters of all the items it encountered to the central processing unit 20. The central processing unit 20 maintains a set of central parameters. The central processing unit 20 processes the data received from the plurality of machines 30 in the system by running each input to generate and modify the central parameters, which are used to characterize the next fruit.

The central processing unit 20 also incorporates an artificial intelligence program. As the central processing unit 20 receives data from all the machines 30 in the network, it will develop a broader set of parameters that cover all the global possibilities. Furthermore, the central processing unit 20 will be able to analyze regional trends, unlike the machines 30. Based on the trends and patterns it sees, the central processing unit 20 can prepare certain machines for new parameters they will encounter. Alternatively, machines 30 can directly share with each other data that they encountered, effectively "educating" one another.

The central processing unit 20 also receives external data 40, such as intelligence data or any data to be selectively distributed to the machines 30. The external data 40 may include intelligence information or details about situations in certain regions. For example, suppose a situation where the machines are detection machines. If a valuable painting is stolen in Florence, Italy, the outside data can be used to inform the central processing unit 20 of this situation. The central processing unit 20 can, in response, adjust the parameters to heighten the sensitivity for paintings and transmit the adjusted parameters to the machines so that the machines will almost immediately be "looking for" the stolen painting. Likewise, if a stadium has long lines that are moving slowly, a request can be input to lower the sensitivity level of the machines at the entrance to help move the lines along faster. In another instance involving the produce sorting machine, information regarding expected weather trends in a given geography can alert the system to heighten the detection of certain types of damage that are correlated to this weather. In another instance, a turbine safety inspection machine may learn pattern of certain blade damage due to increased feather residues from increased bird migration during certain seasons and geographies and adjust those machines to increase sensitivity for those inspection machines each year at that period and in that region. The external data 50 may be input by the machine trainer 40 or from another source.

Figure 2:
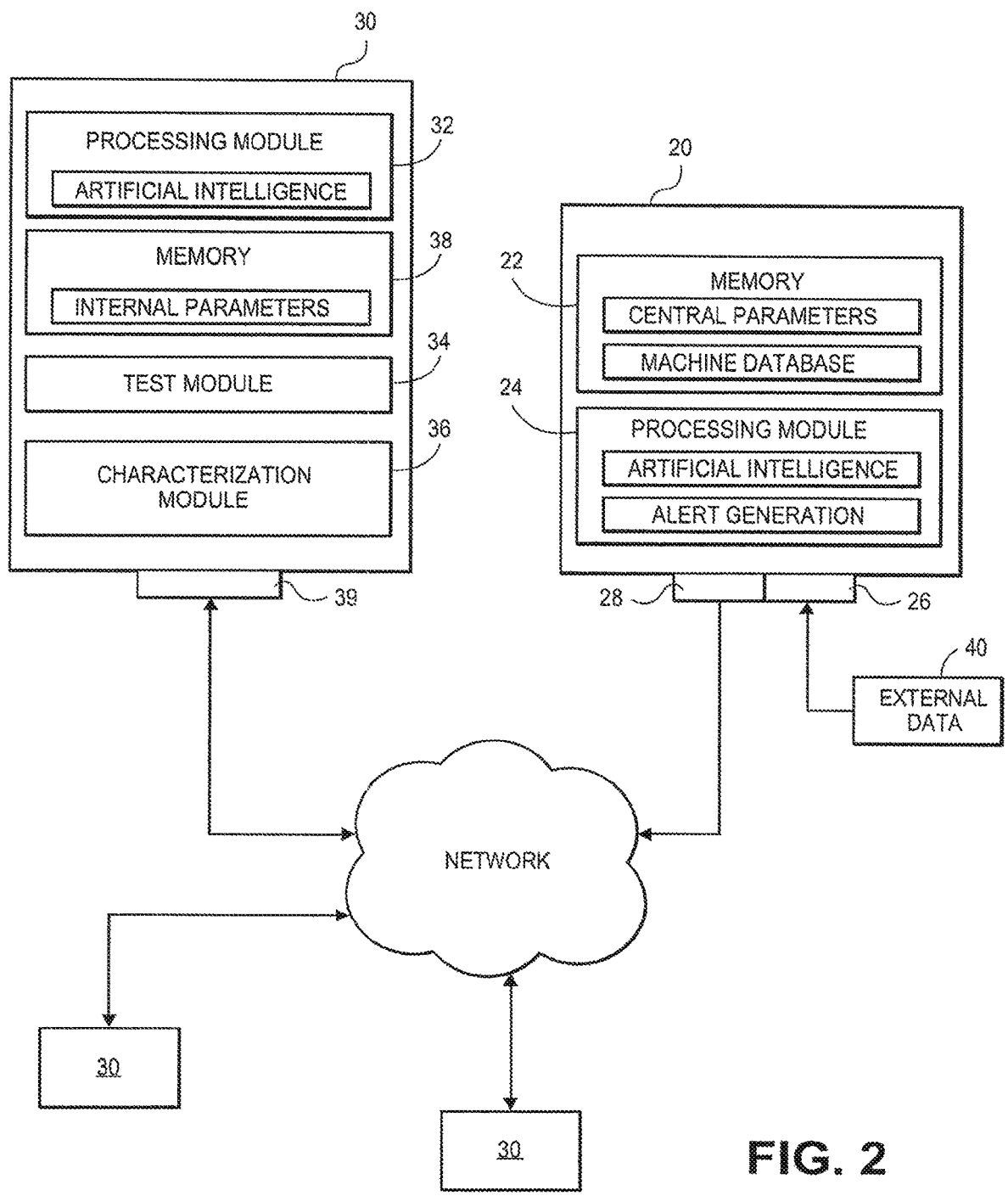
FIG. 2 is a detailed depiction of the machines and the central processing unit.

FIG. 2 depicts one embodiment of the machine 30 and the central processing unit 20. Each machine 30 has a processing module 32 that employs artificial intelligence and a memory 38 that stores internal parameters. The processing module 32 and the memory 38 are together referred to as a "processing unit" (32+38). In addition to having a processing unit, the machine 30 is configured to receive items, move the received items, for example with a moving mechanism, and subject each item to one or more tests via a test module 34. The test may be a simple determination of shape or weight, and may be a more complex form of imaging, as well as any other known tests that would help analyze or detect a condition. Using the test results (e.g., measurements), a characterization module 36 characterizes the item. The test module 34 and the characterization module 36 are together referred to as a "measurement unit" (34+36), and includes physical components for receiving, holding, and testing items. If more information is needed to characterize the item, the machine 30 requests extra information from an external source, such as an operator or additional sensors. In characterizing the item, the machine 30 uses the internal parameters stored in a memory 38. The internal parameters were previously generated by correlating items with different conditions with their characterization. Hence, the characterization includes comparison of the measurements against the internal parameters. As more extra information is received, each machine may update or modify its set of internal parameters. The machine 30 has a receiver/transmitter 39 for exchanging information via the network.

The central processing unit 20 includes a processing module 24 that includes an artificial intelligence program, and a memory 22 that includes a machine database for storing central parameters and data about the different machines in the network. The processing module 24 and the memory 22 are together referred to as the "processing unit" (24+22). The central processing unit 20 generates its own set of central parameters based on the measurement and characterization data it received from the machines 30. The central parameters are likely to be much more extensive and inclusive compared to the local internal parameters on any single machine 30 because while each machine 30 only encounters the items that it directly handles, the central processing unit 20 has a global perspective. The machine database keeps track of all the machines that send information to it. Upon receiving data, the central processing unit 20 may tag the data with a machine ID to track which machine, group of machines, or family of machines that share knowledge, the data came from. This way, the central processing unit 20 can catch any trends such as weather or other external common phenomena, or be on the lookout for a pattern that may be a warning sign. The central processing unit 20 also uses the machine database to determine which machine will benefit from a new update/modification to the parameters.

As shown, the central processing unit 20 and each machine 30 has a receiving portion 26 and a transmitting portion 28 for communicating to other machines 30 and processing units in the network. The receiving portion 26 and the transmitting portion 28 may be one physical component. As mentioned above, the central processing unit 20 also receives external data 40 from a source other than the machines 30. When the processing module 32 of a machine 30 determines that there is an unusual situation at hand or the situation may need a warning, it generates an alert via the alert generator. Upon receiving the alert, either internal system reactions would take place to trigger an action (such as redirecting the item) or a human operator would be able to assess the situation and respond appropriately. The alert may be some type of audiovisual output to a device accessed by the operator.

Although not explicitly shown, both the machines 30 and the central processing unit 20 can include a user interface for communicating with an operator and/or machine trainer.

Figure 3:
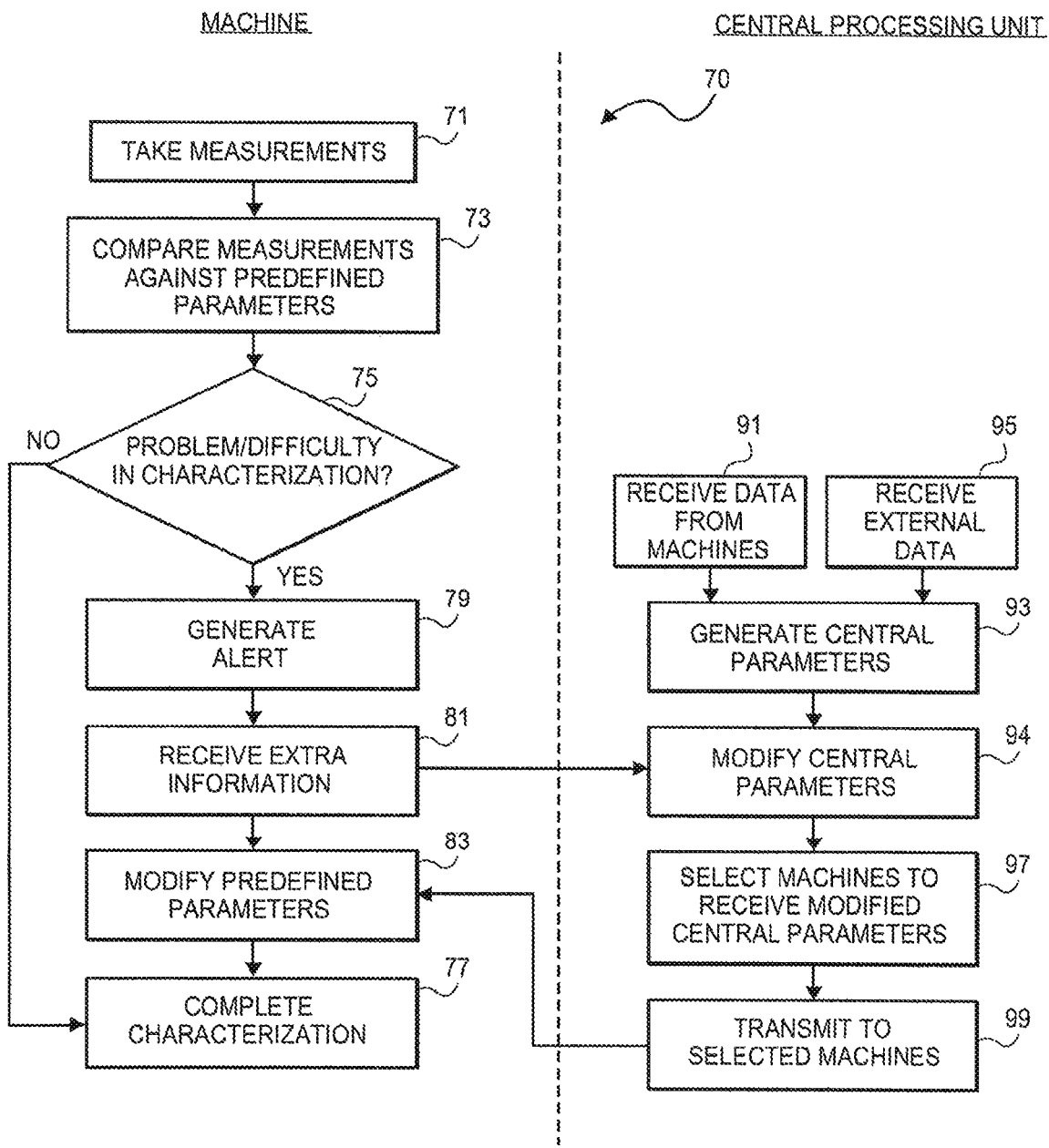
FIG. 3 is a flowchart illustrating the parameter updating process.

FIG. 3 illustrates the iterative parameter updating process 70 of the machine network system 10, as well as the iterative data flow between the machines 30 and the central processing unit 20. The iterative data flow may happen directly between different machines 30, or between machine groups (each "machine group" includes a plurality of machines). As shown, a machine 30 receives items and subjects each item to a test to obtain measurements (step 71). In this flowchart, it is assumed that the machine 30 has already received its initial training and has a preliminary set of parameters. The measurements are then compared against these parameters to determine an outcome (step 73). If the measurements fit substantially well with the parameters of one of the previously encountered items (step 75—"no"), the machine 30 concludes that no new item/situation is encountered and proceeds to characterize or process the item consistently, the way that it is trained to process items with those parameters (step 77). The machine 30 may store, either in a local storage unit or at the central processing unit 20, data from the scan regardless of the outcome. If the measurements do not match any previously encountered set of parameters well enough (step 75—"yes"), an alert is generated to either trigger an automated response or alert an operator (step 79). The operator examines the item, reviews the measurements, and subjects the item to additional tests if desired to come up with a characterization. In some embodiments, the machine 30 collects additional information. The operator then provides feedback (extra information) to the machine by inputting his characterization (step 81). The machine updates its parameters to incorporate the extra information that it just received (step 83). The measurements that triggered the alert and the operator input are either retained within the machine 30, and or transmitted to other machines 30, and or transmitted to the central processing unit 20 (step 85).

The machines 30, groups of machines 50, or the central processing unit 20 receives measurements and characterizations from machines in the machine network 10, which are often at different locations (step 91). The central processing unit 20, the machines 30, and/or groups of machines 50 receive data independently of the machines 30 and has its set of central parameters (step 93) from previous training. The training may be based on its own internal data sets or data sets received from other machines 30, families of machines 50 and/or the central processing unit 20. As mentioned above, the central processing unit 20 also receives external data (step 95).

The machines 30 and/or the central processing unit 20 continually modifies its central parameters 94 based on the measurement data it receives from the machines 30, families of machines 50, and the central processing unit 20 and the extra information 81 that pertains to previously un-encountered items/conditions. Central parameters help the machines 30, family of machines 50, and the central processing units 20 to identify which items are being encountered by almost all the machines, so the parameters for that items can be strengthened. Central parameters may be used to selectively increase the "resolution" of detection. Once central parameters are modified, the central processing unit 20, the machines 30 and/or families of machines 50 identifies, either for its self or other, machines that would benefit from the updated parameters, e.g. the machines that would encounter the condition/item that is affected by the updated parameter (step 97). For example, where the newly found condition is due to a fruit disease that is only in a certain region, parameters for the condition would not be sent to machines at other locations. On the other hand, if the parameters pertain to a condition that is applicable to any location (e.g., a bruise) the parameters may be sent to all the machines 30. The updated parameters are then transmitted to the identified select machines (step 99).

The machines 30 that receive the modified central parameters may further modify their own internal parameters to reflect the modified central parameters. This way, the machines 30, other machines 30, other families of machines 50 and the central processing unit 20 are continually teaching and learning from one another. The machine 30 in the machine network 10 learns from multiple sources: 1) items that pass through the machine, 2) extra information received, e.g. from the local operator, 3) updated parameters received from the central processing unit 20, 4) new data and updated parameters from itself, 5) data and updated parameters from other machines 30, or families of machines 50.

Figure 4:
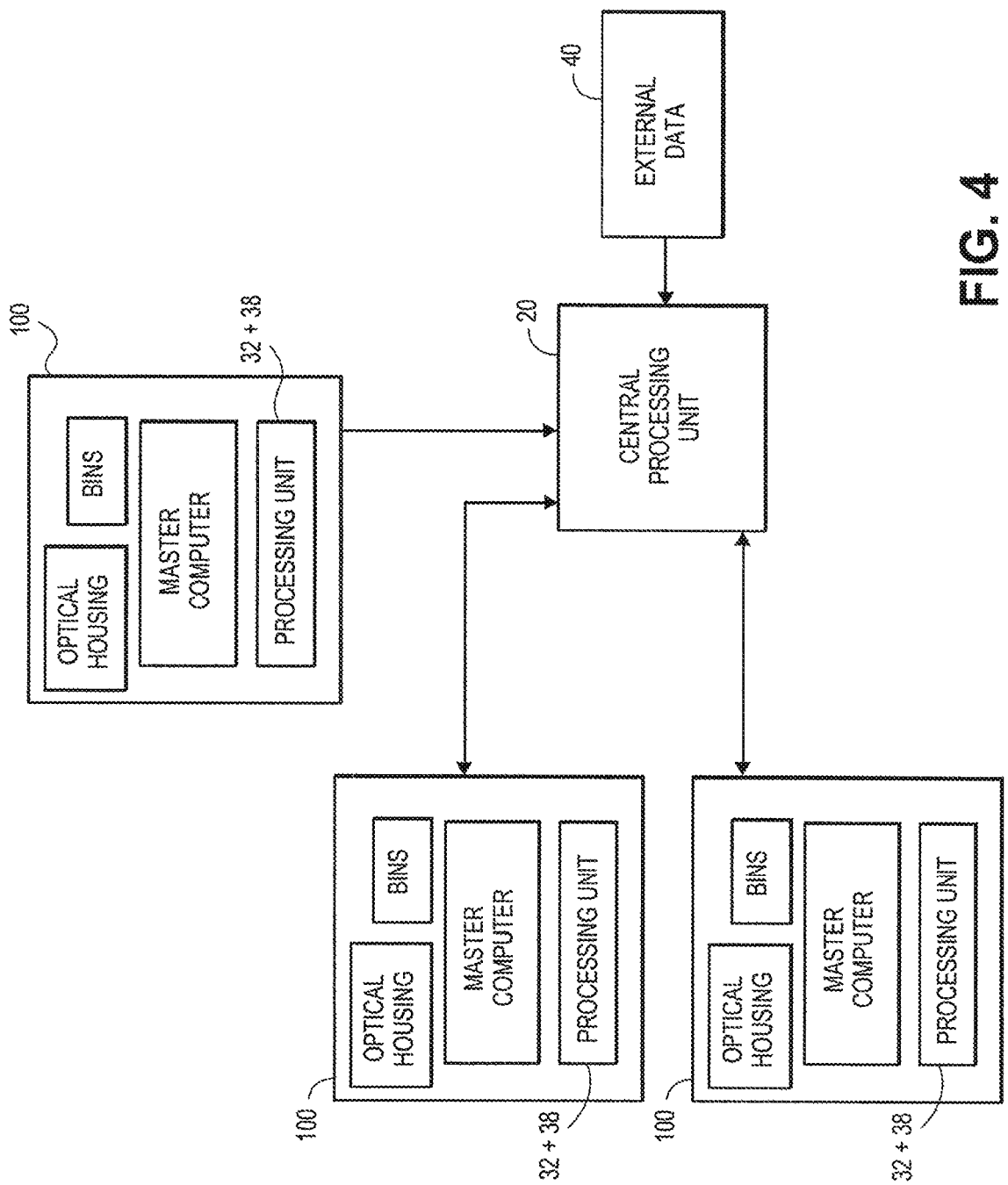
FIG. 4 depicts an example embodiment where each machine is a sorting machine.

FIG. 4 depicts an embodiment where each machine 30 is a sorting machine 100. The sorting machine 100 may be a fruit sorting machine that incorporates the features described in U.S. Pat. No. 5,845,002 and is enhanced with the processing unit 32+38 to include artificial intelligence and internal parameters. Although the inventive concept is not limited to being used with any particular type of machine, the disclosure is provided to provide a concrete example of how the processing module 32 in machine 30 and or central processing unit 20 may be used.

Figure 5:
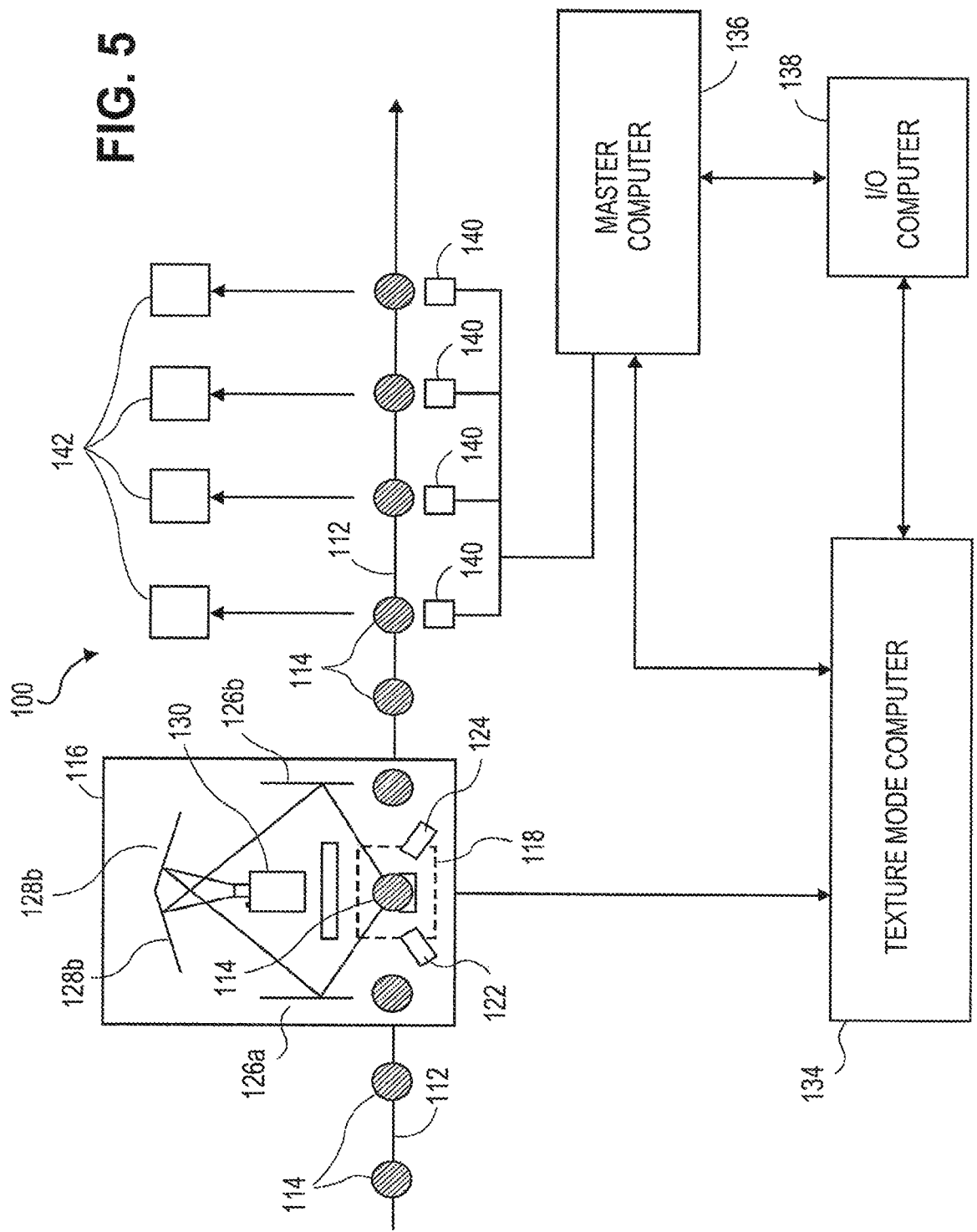
FIG. 5 depicts one of the machines of FIG. 4 in more detail.

FIG. 5 shows select parts of the sorting machines 100 in more detail. As shown, the sorting machine 100 includes a conventional conveyor line 112 upon which a plurality of items 114 are conveyed. For simplicity of illustration, this particular depiction does not show the processing unit, although the processing unit is part of the sorting machine 100. This is just one example embodiment, and use of a conveyor line is not a limitation of the inventive concept—items can be examined in static situations or utilizing other movement mechanisms such as robotics. The items 114 are fruit (e.g., citrus fruit) in the context of this disclosure, although this is not a limitation of the inventive concept. The particular sorting machine 100 may be suitable for items that are generally spherical and have a topographic surface texture. In other embodiments, the sorting machines 100 may be replaced by medical examination machines, object screening machines, etc.

The conveyor 112 transports the fruit 114 into an optical housing 116, where the fruit is illuminated at an inspection station 118 within an optical housing 116. The conveyor 112 transports and orients the fruit 114 to control the presentation of the fruit 114 for imaging. The conveyor is designed to provide a maximum optical exposure of fruit 114 at inspection station 118. Conveyor system 112 in the illustrated embodiment includes driven spools to rotate the fruit 114. In the embodiment of FIG. 4 and FIG. 5, the fruit 114 is rotated in a retrograde direction as it moves through the inspection station 118 to at least partially compensate for its forward motion down conveyor 112. The fruit 114 is rotated so that the same surface tends to remain facing a camera 130 during an extended time exposure to allow complete and reliable imaging. This may, of course, be time-synchronized by means well known in the art.

When the fruit 114 is carried by the conveyor 112 into the housing 116 and to inspection station 118, the fruit 14 is illuminated by a pair of light sources 122, 124. The light sources 122, 124 are focused on the fruit 114 from below and may further be provided with conventional optics to assist in providing optimal illumination of the surface of the fruit 114.

The optical sources 22, 24 may be optical fibers, or laser beams or light beams formed by LEDs. Alternatively, a single light source may be utilized and may be optically divided into two optical sources 22, 24. The light sources 22, 24 (or a single light source) provide the incident light that will be scattered within the fruit to cause it to glow. The frequency or frequency spectrum of the light is selected based on the optical properties of the object to be inspected, to produce the desired scattering within the object, and the resultant projection of that glow through the surface thereof. With citrus fruit, the ordinary visible spectrum may suffice.

The camera 130 is coupled to a texture mode computer 134. The texture mode computer 134 is a personal computer coupled to both a master computer 136 which runs the functions of the conveyor and sorting systems and to an input/output computer 138, which provides user input and output access to the system 100. The texture analysis of the fruit 114 is made by the texture mode computer 134. According to user instructions, input through input/output computer 138 to master remote computer 136 will implement a sorting operation as dictated by texture mode computer 134 at a plurality of sorting stations 140, which may include solenoid-actuated ejection fingers upon which the fruit 114 rides, and by which the fruit 114 is ejected from the conveyor line 112 into appropriate sorting bins 142 or secondary conveyors.

The texture module of the sorting machine 100 is made up of three subsystems that include the lighting and optics (including the optical housing 116), imaging as provided by the cameras 30 and mirrors 126a, 126b, 128a, 128b, and image processing within the texture mode computer 134.

The central input/output computer 138 and the master remote computer 136 are conventional and are substantially the same as used in prior art classification and sorting apparatus. The central input/output computer 138 provides for system control including providing for all aspects of user interface, selection for input and output of various classification parameters, and for determining conveyor paths in the machine 100 where multiple lanes for the conveyor 112 are provided in a more complex array than the simple linear depiction of FIG. 4.

For certain applications, it may be desired to use a specific wavelength or spectrum of incident light, so that a desired optical effect may accentuate the particular type of defect in that type of object to be monitored. It is left to the reasonably skilled practitioner, faced with the particular type of object and defect, to determine the correct frequency or spectrum of the incident light.

The inspection station 118 is appropriately baffled as desired, either to provide flat black nonreflecting surface to avoid spurious images, or to include reflective surfaces if desired to increase the light intensity incident upon the fruit. In the embodiment illustrated in FIG. 5, the glow from light scattered within the fruit 114 and projected through its peel is reflected from lower mirrors 126a, 126b, and from there to upper mirrors 128a, 128b. A CCD matrix or scanning camera 130 has its optics 132 focused on the upper mirrors 128a, 128b to capture, in a single computer image, virtually the entire exterior surface of a hemisphere of fruit 114.

Figure 6:
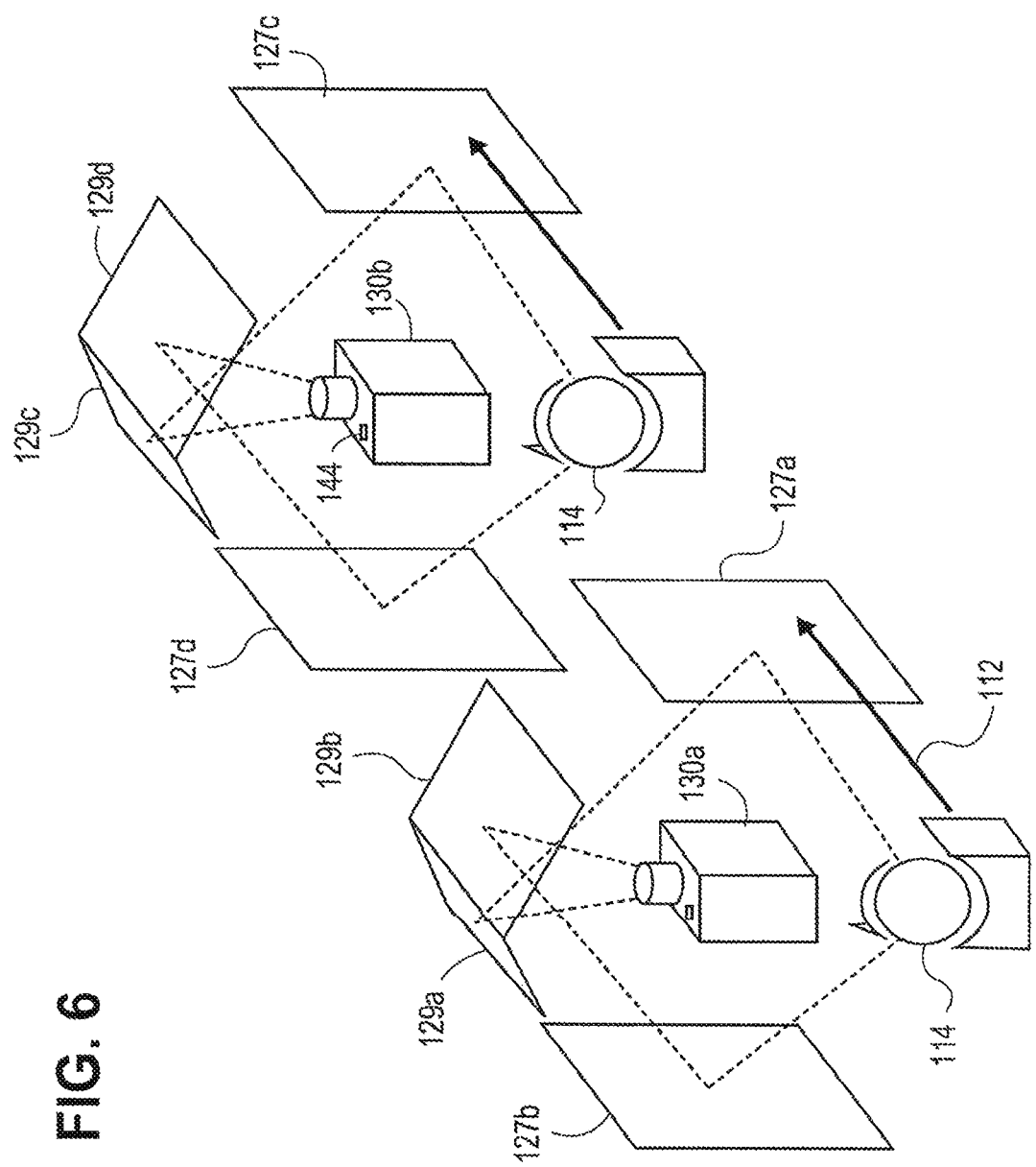
FIG. 6 depicts an optical unit portion of the machine in FIG. 5.

As shown in FIG. 6, there are two cameras 130a, 130b, each of which captures an image of one of the two hemispheres of the fruit 114. For example, the first hemispheric image of the fruit 114 is reflected by the lower right mirror 127a to the upper left mirror 129a and from there to the first camera 130a. The image of that first hemisphere is also reflected by the lower left mirror 127b into upper right mirror 129b in the first camera 130a.

After the fruit 114 has proceeded down the conveyor 112 and experienced a synchronized rotation to expose its other hemisphere, the image of the second hemisphere of the fruit 114 is reflected by the lower right mirror 127c to the upper left mirror 129c, and from the lower left mirror 127d to the upper left mirror 129d, both resultant images being reflected into the other camera 130b.

The lighting system uses two tungsten Halogen projection lamps 122, 124 situated on opposite sides of the fruit 114 and below the fruit centerline. The lamps emit enough light of the proper frequency or spectrum incident on the fruit 114 to create a glowing effect transmitted through the peel/skin of the fruit 114 that can be detected by a camera. In other words, the fruit will provide a glowing effect to the camera provided that the positioning, intensity, and frequency/spectrum of the light is such that the light penetration into the peel or rind of fruit 114 occurs and is scattered therewithin to provide a glowing effect through the peel.

There is no special filter on the camera 130, and time exposure of the imaging is electronically controlled. Electronic control of the time exposure compensates for any difference in the intensity of the glow due to differences in fruit size and peel thickness. This can be determined during the initial part of the run and appropriate corrections, either automatic or manual, may be entered through the input/output controller 138.

Automatic control may be effected by user of a photodiode 144 mounted on each camera 130 to generate an output frequency, by a frequency generator (not shown), which depends upon the amount of light sensed by each photodiode. By using the output frequency from the frequency generator controlled by photodiodes 144, the exposure time on the CCD chip within cameras 30 is controlled.

There are a large number of ways in which the fruit 114 may be illuminated, as well as ways in which a computer image may be taken of the fruit 114, either with the user of one or more cameras and various optical systems and configurations. A substantially complete computer image of each fruit 114 is provided so that texture characterizations as discussed below will not omit any significant portion of the fruit surface. For some applications, an image of one hemisphere only, using a single camera 30 and simplified optics, may be sufficient.

The texture mode computer 134 performs image processing and passes the classification information to the rest of the system for final drop-out selection according to means known in the art.

Figure 7A:
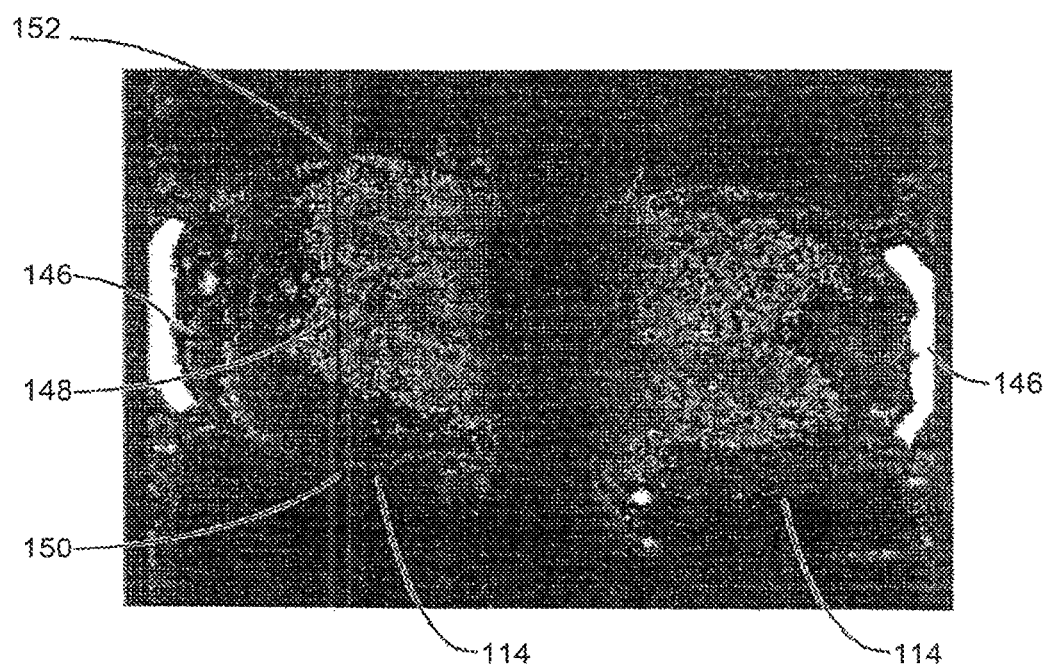
FIG. 7A is a computer image of fruit showing soft puff and crease as detected by the machine of FIG. 5.

Now, processing of the captured image to provide topographic surface texture grading will be described. In the illustrated embodiment, the first step is to drop out invalid information such as reflected light intensities from the light sources 122, 124 which do not constitute the glow from light scattered within the fruit 114 and emerging through its peel. Turning to FIG. 7A, bright portions 146 of an actual computer image of a smooth fruit peel are depicted. Two images of fruit 114 are shown in FIG. 7A, depicting in essence the two hemispherical views of the fruit. Thus, regions 146 of the graphic image, because of their distinctively higher intensity levels, can be eliminated as portions of the graphic information signal carrying no information about the topographic surface texture.

A scan of the fruit surface is made to provide maximum, minimum, and standard deviation of the intensity of the entire pixel pattern constituting the image, to provide an indication if there are intensity variations in the image which could constitute surface defects requiring further examination, such as puff and crease, peel, cuts, punctures, etc.

A puff in a citrus fruit is an area of the peel which is slightly detached from the underlying meat, and thus will be slightly swollen or "puffed out." A crease is the reverse, in which a portion of the rind surface has been depressed relative to adjoining areas.

If no defects are detected, then the graphic image is checked for high frequency data which, for example, would be indicative of pebbliness of the fruit surface. The data derived from the fruit 114 can then be fed back to the master computer 136 for classification purposes according to predefined criteria.

In an instance where global statistical analysis of the fruit surface indicates that peel defects exist, the type of defect can then be determined by applying a series of data filters to identify them. The high pass data filter can be used to search for cuts or punctures. A low pass filter with blob analysis, tracing and aspect ratio of areas of greater intensity is useful to identify puff and crease and to distinguish it from rot.

After the puff and crease data is separated, a series of checks to show peak intensities over standard deviation values can be used to identify the degree of defect within a category of defect, such as puff and crease. After this processing is done, the size of the fruit as a whole is compared with the area affected in order to generate a percentage value for the defect of the affected surface. Other defects, such as rot or breaks in the rind may not be subject to a percentage evaluation, but may constitute a cause for immediate rejection of the fruit regardless of the percentage of the affected area of the fruit.

FIG. 7A, in which a computer image of a smooth orange rind is depicted, illustrates the double image from the reflected image provided to the camera. Brightened areas 146 from the illumination source are eliminated as not containing information relevant to the nature of the peel condition. Statistical information is then taken of the entire graphic image to obtain maxima, minima, and standard deviations to characterize the intensity variations of the image pixels. In this case, the statistical deviations which would be returned would indicate that the fruit was smooth and well within the acceptable range. At that point, further statistical analysis would not be performed, and the fruit position tagged within the sorting machine 100 and carried down conveyor 112 to be routed to the appropriate sorting bin 142 or secondary conveyor, or for analysis and classification according to additional methods and criteria.

Figure 7B:
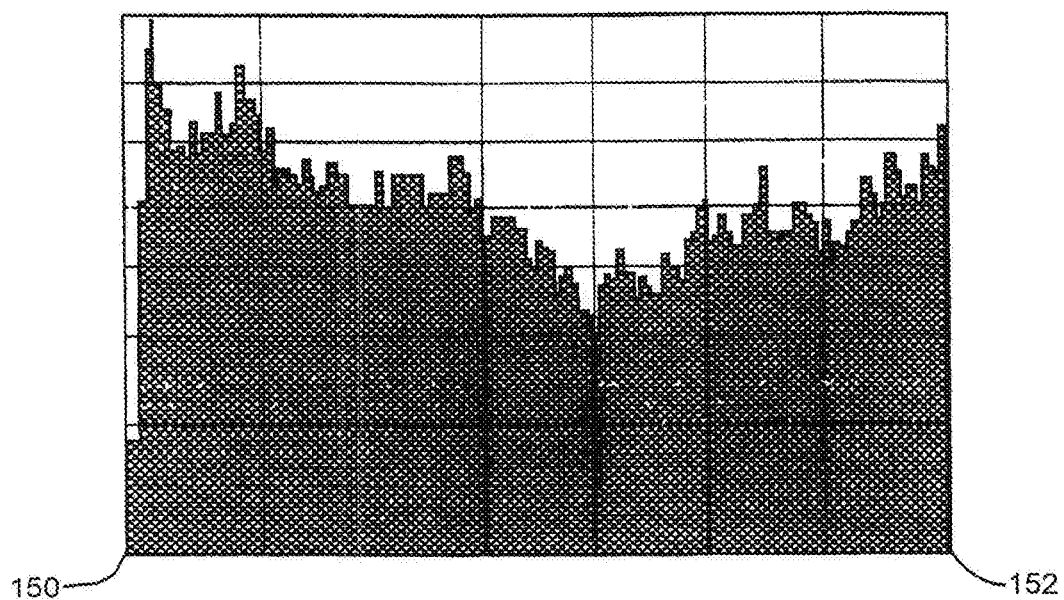
FIG. 7B is a histogram of the fruit surface corresponding to the image of FIG. 7A.

For the purposes of illustration, a typical scan line 148 is taken across one portion of the two hemispherical images in FIG. 7A. Scan line intensity is then depicted in the histogram of FIG. 7B where intensity is graphed against the vertical scale and positioned along the scan line along the horizontal scale with end 150 corresponding to the left end of the histogram of FIG. 7B and end 152 of scan line 148 corresponding to the right end of the histogram of FIG. 7B. A visual examination of the histogram of FIG. 7B indicates variations of pixel intensity maintained within a range of values with a fairly limited deviation from a mean, to provide a pattern quite different from the histograms depicted in FIGS. 8-14, wherein various fruit defects are illustrated. Through conventional statistical measures, the histograms can be characterized by meaningful statistical parameters, and through those parameters, sorted into categories to reliably identify the topographic surface texture of the fruit 114.

Figure 8:
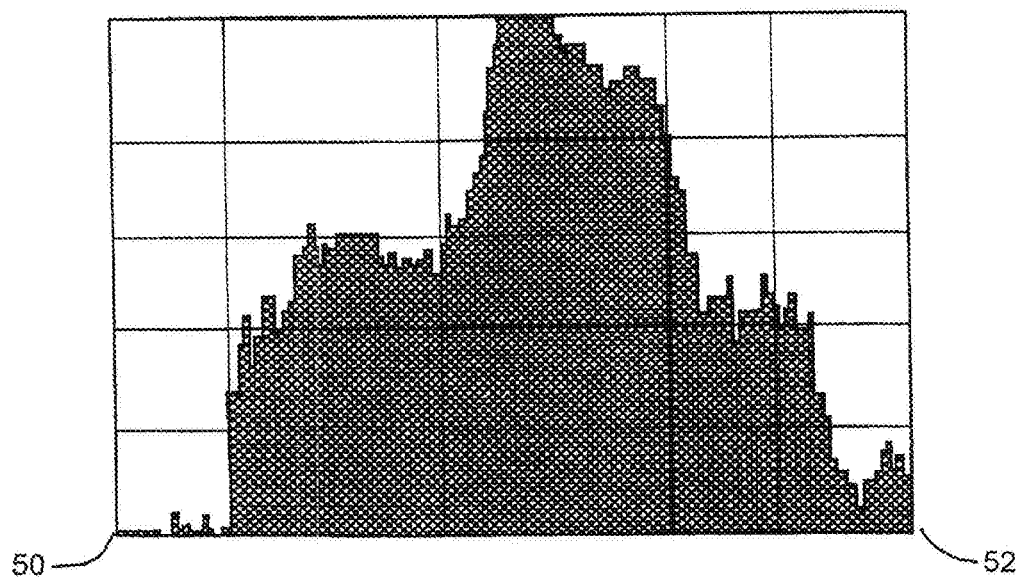
FIG. 8 is a histogram obtained from a surface of a fruit having sour rot.
Figure 9:
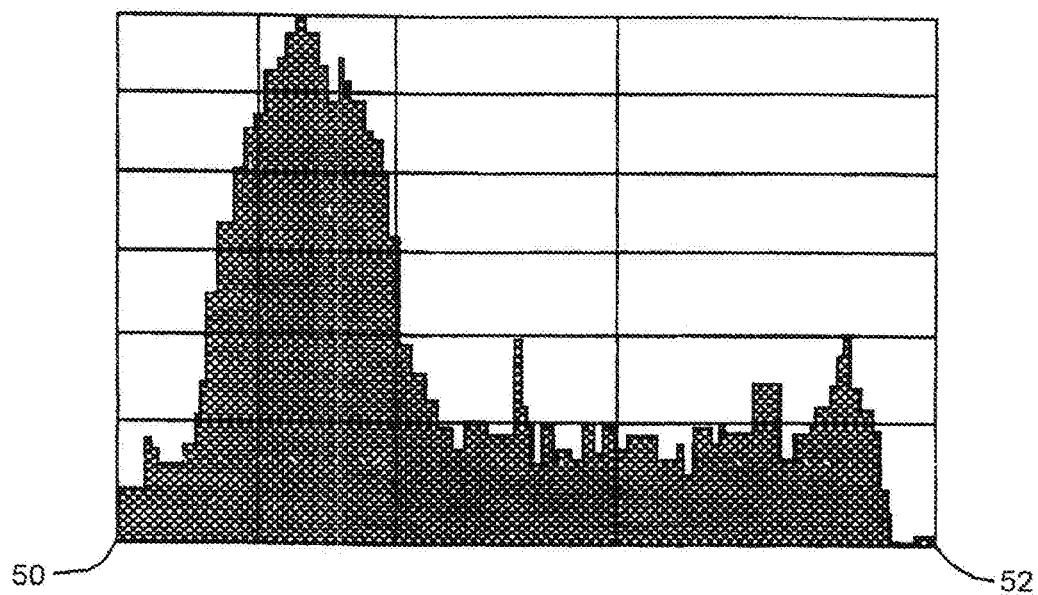
FIG. 9 is a histogram obtained from a surface of a fruit having clear rot.
Figure 10:
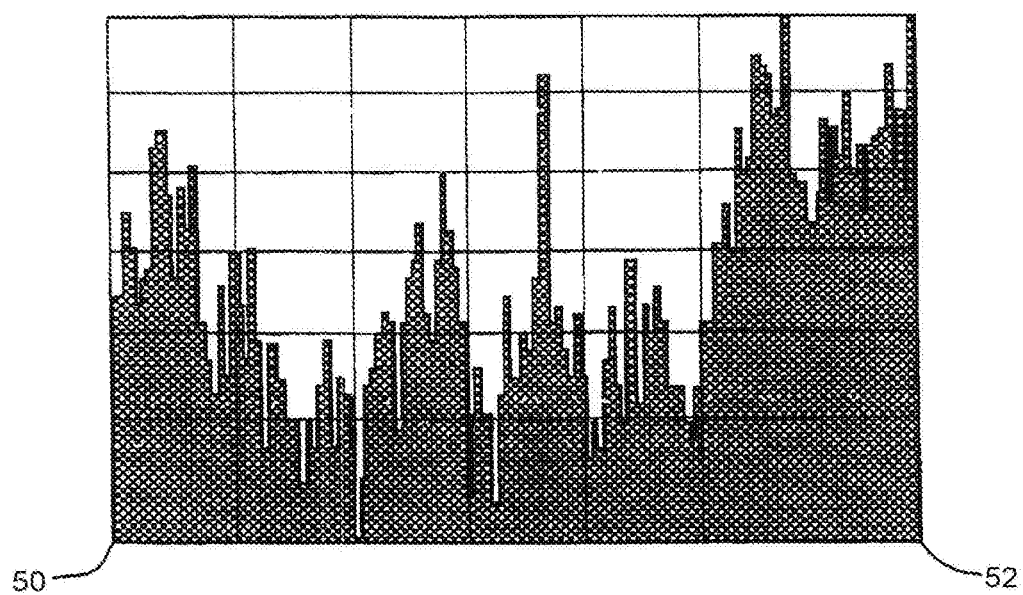
FIG. 10 is a histogram obtained from a surface of a fruit having a pebbled peel.
Figure 11:
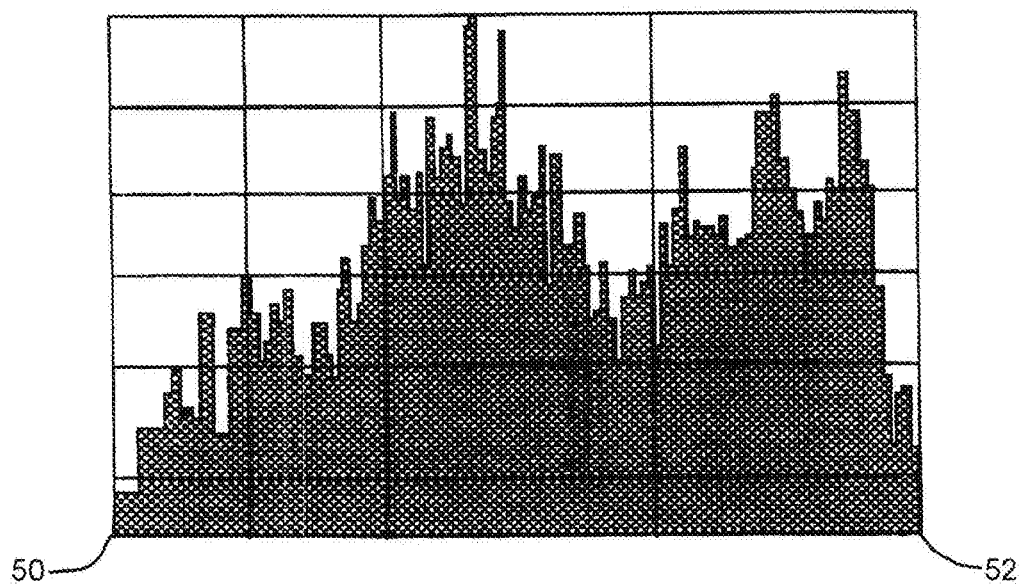
FIG. 11 is a histogram obtained from a surface of a fruit showing soft puff and crease condition.
Figure 12:
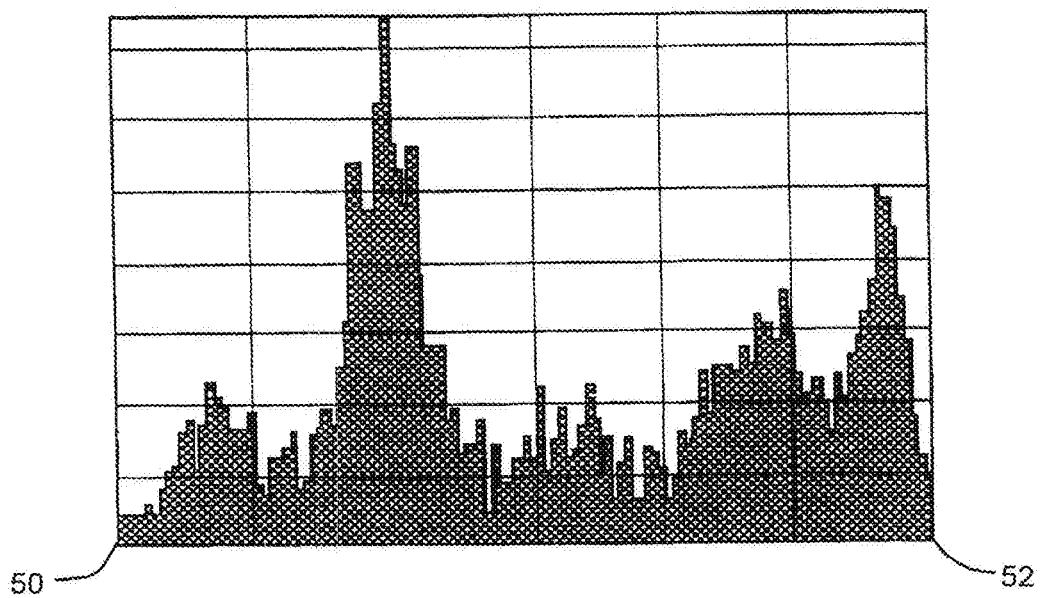
FIG. 12 is a histogram obtained from a surface of a fruit showing a ridge and valley defect.
Figure 13:
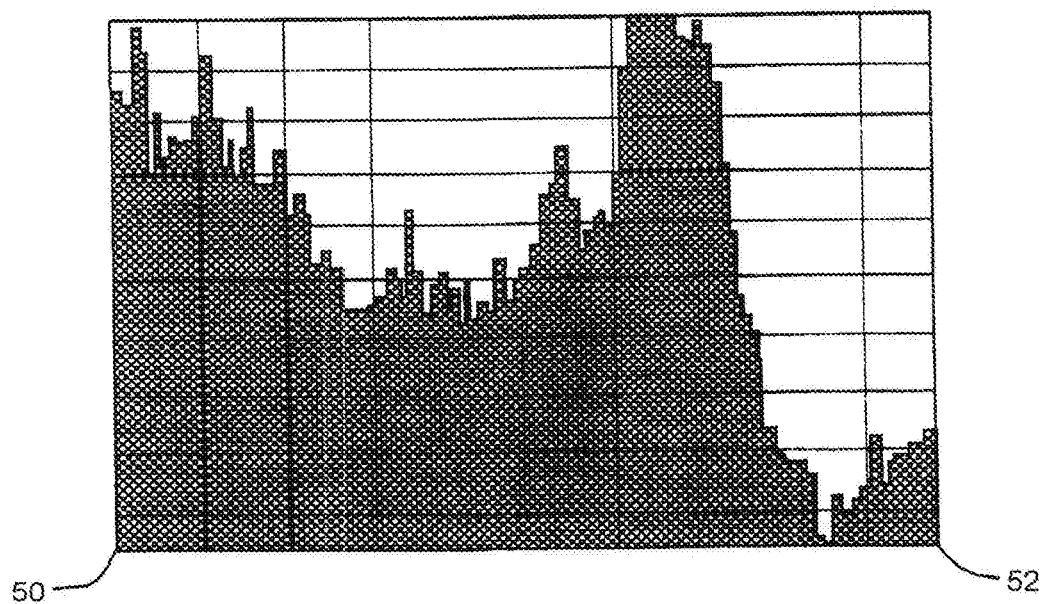
FIG. 13 is a histogram obtained from a fruit having a split or cut in the peel.
Figure 14:
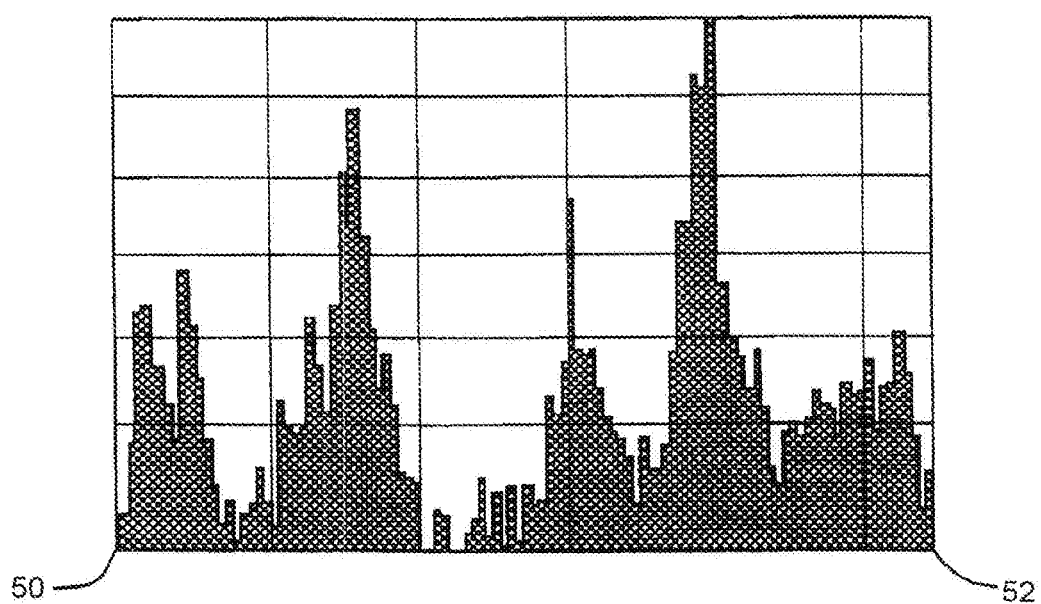
FIG. 14 is a histogram obtained from a fruit having clear puff and crease condition.

FIG. 8 depicts an intensity histogram taken from a computer image of a fruit 114 that is blemished by a surface decomposition known as sour rot. As compared to the histogram of FIG. 7B, there is a much wider variation between maxima and minima, and deviation from the mean is much greater than in the case of FIG. 7B. FIG. 9 depicts an intensity histogram taken from a computer image of a fruit 114 that is characterized by a clear rot skin blemish. The histogram shows a large peak sharply falling off to an average pixel intensity. FIG. 10 depicts an intensity histogram taken from a computer image of a fruit 114 that is characterized by high porosity or a pebbled surface that some consumers may dislike. FIG. 11 depicts an intensity histogram taken from a computer image of a fruit 114 whose surface is blemished by a condition known as soft puff and crease, and FIG. 12 is a histogram taken from a fruit 114 whose surface is blemished by a defect known as ridge and valley. FIG. 13 depicts a histogram taken from a fruit 114 with "fracture," which include splits, cuts, punctures, and scrapes. FIG. 14 depicts a histogram taken from a fruit 114 with a skin defect called clear puff and crease.

Each of the histograms described above may be saved in the memory of the machines as part of predefined conditions for characterizing the fruit. Upon taking a measurement from a newly received fruit, the machine 30 will subject it to the imaging test to produce an image similar to that disclosed in FIG. 7A and generate a histogram. The histogram will be then compared against the stored histograms that indicate certain conditions/defects to make a characterization.

Now, the process 70 of FIG. 3 can be explained in the context of the sorting machine 100. Sorting machines 100 may be placed in different facilities such as farms and orchards, possibly in different parts of the world. Each sorting machine 100 would initially be "trained" by its sets of data obtained from samples or an operator who runs a representative sample of fruits through the machine and provides input as to in which bin 142 each fruit in the sample should be placed. The sorting machine 100 develops its own set of parameters based on the sample fruits and the inputs, and uses these parameters to categorize the next fruit it encounters. More specifically, in step 71, the fruit is imaged as two hemispheres, in the manner shown in FIG. 7A, with a scan line 148 across one portion of the two hemispherical images. Scan line intensity is then depicted in a histogram, similarly to what is shown in FIG. 7B and FIGS. 8-14. In step 73, the machine compares the histogram of the current fruit against its internal parameters. If there is a substantially close match between the histogram of the current fruit and one of the previously-generated histograms (step 75—"no"), the current fruit will be sorted or categorized into the same bin 142 as the previous fruit that generated the similar histogram (step 77). On the other hand, if the histogram of the current fruit does not resemble any of the previously generated histograms closely enough (step 75—"yes"), an alert is generated (step 79). To the system or to an operator, in response to the alert, the data is used to train and determine how the fruit should be categorized, and tells the machine 100 how it should be categorized (step 81). The machine 100 modifies or updates its internal parameters with this new data (step 83) and categorizes the current fruit according to the operator input (step 77).

The machines 30, family of machines 50, and/or central processing units 20 initially receive the scan data and categorization data from selections of machines, and in some cases all the machines in the network (step 91), and generates its own central parameters (step 93). The central parameters may not be exactly the same as the local parameters on any one machine 100 since the machines 30 and or processing units 20 "see" more fruits than any single machine 100 in the network, and is presumably exposed to many more variations and conditions than any single machine 100. The central parameters, thus, may be broader in the range of defects that are covered and able to distinguish defects with a higher resolution. The machine 30, family of machines 50, and/or the central processing units 20 also receives any external data (step 95). For example, the external data might be a request from a Department of Agriculture to report all cases of a specific condition, or local weather conditions.

The machine 30, family of machines 50, and/or central processing units 20 then identifies the machines 100 that they should receive data from and that should receive the updated/modified central parameters (step 97). For example, if the update/modification to the parameters pertains to a pebbliness of the fruit skin, this update would be sent to machines 100 whose primary function is to sort fruits to send to various grocery stores. However, the modified parameters would not be sent to machines at a juicing factory because the texture of the fruit skin would not matter much to the juicing process, which typically happens after the skin is removed. At the same time, the machine 30, family of machines 50, and/or central processing units 20 also determines that all the machines 100 in the network should receive the request from the external data. The data and or parameters are then transmitted to the selected machines (step 99).

Various embodiments of the processing units may be implemented with or involve one or more computer systems. The computer system is not intended to suggest any limitation as to the scope of use or functionality of described embodiments. The computer system includes at least one processor and memory. The processor executes computer-executable instructions and may be a real or a virtual processor. The computer system may include a multi-processing system which includes multiple processing units for executing computer-executable instructions to increase processing power. The memory may be volatile memory (e.g., registers, cache, random access memory (RAM)), non-volatile memory (e.g., read only memory (ROM), electrically erasable programmable read only memory (EEPROM), flash memory, etc.), or combination thereof. In an embodiment of the present disclosure, the memory may store software for implementing various embodiments of the disclosed concept.

Further, the computing device may include components such as memory/storage, one or more input devices, one or more output devices, and one or more communication connections. The storage may be removable or non-removable, and includes magnetic disks, magnetic tapes or cassettes, compact disc-read only memories (CD-ROMs), compact disc rewritables (CD-RWs), digital video discs (DVDs), or any other medium which may be used to store information and which may be accessed within the computing device. In various embodiments of the present disclosure, the storage may store instructions for the software implementing various embodiments of the present disclosure. The input device(s) may be a touch input device such as a keyboard, mouse, pen, trackball, touch screen, or game controller, a voice input computing device, a scanning computing device, a digital camera, or another device that provides input to the computing device. The output computing device(s) may be a display, printer, speaker, or another computing device that provides output from the computing device. The communication connection(s) enable communication over a communication medium to another computing device or system. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media includes wired or wireless techniques implemented with an electrical, optical, RF, infrared, acoustic, or other carrier. In addition, an interconnection mechanism such as a bus, controller, or network may interconnect the various components of the computer system. In various embodiments of the present disclosure, operating system software may provide an operating environment for software's executing in the computer system, and may coordinate activities of the components of the computer system.

Various embodiments of the present disclosure may be described in the general context of computer-readable media. Computer-readable media are any available media that may be accessed within a computer system. By way of example, and not limitation, within the computer system, computer-readable media include memory, storage, communication media, and combinations thereof.

It should be understood that the inventive concept can be practiced with modification and alteration within the spirit and scope of the appended claims. For example, although certain embodiments of the machine 100 are described herein, the system of the inventive concept is not limited to being implemented with only the disclosed embodiments. The system may be implemented, for example, with other types of machines that are configured to detect and characterize items other than fruit, including but not limited to medical devices, security check machines, and store inventory trackers, etc. The description is not intended to be exhaustive or to limit the inventive concept to the precise form disclosed. It should be understood that the disclosed concept can be practiced with modification and alteration.

What is claimed is:

1. A self-updating apparatus configured to characterize items or conditions, the apparatus being one apparatus in a network of apparatuses and comprising:
    a first processing unit that includes:
        a first measurement unit configured to receive items and take physical measurements of the items;
        a first memory storing parameters for the items, wherein the parameters are useful for categorizing the items based on the physical measurements taken from the items and characteristics calculated using the physical measurements; and
        a first processing module including an artificial intelligence program, the first processing module:
        automatically selecting a source from which to receive new parameters, wherein the first processing module selects the new parameters to receive based on similarity between physical measurements taken by the first processing unit and physical measurements that were taken by the sources;
        automatically modifying at least some of the parameters that are stored in the first memory with the new parameters received from the source and with measurements taken by the first processing unit to generate modified parameters; and
        transmitting a subset of the modified parameters to one or more recipients, wherein at least one of the source and the recipients is a second processing unit that includes a second measurement unit configured similarly to the first measurement unit, a second memory, and a second processing module configured similarly to the first processing module.

2. The self-updating apparatus of claim 1, wherein the first processing module's selection of the source and the one or more recipients comprises comparison between the parameters stored in the first memory and parameters stored in the source, and between the parameters stored in the first memory and parameters stored in the one or more recipients, respectively.

3. The self-updating apparatus of claim 1, wherein modifying the parameters adjusts the sensitivity levels of the parameters used to categorize the items or conditions.

4. The self-updating apparatus of claim 1, wherein at least one of the source and the recipients is a central processing unit in communication with the first processing unit, the central processing unit being configured to receive subgroups of parameters from the network of apparatuses, generate updated central parameters based on received subgroups of parameters, and send different subsets of the updated central parameters to selected apparatuses of the network of apparatuses.

5. The self-updating apparatus of claim 4, wherein the central processing unit is at a geographically remote location from the first processing unit.

6. The self-updating apparatus of claim 4, wherein the first processing unit is configured to transmit the subgroup of parameters to a second processing unit, wherein the subgroup of parameters that is transmitted is selected to reduce differences between parameters stored in the first processing unit and the second processing unit.

7. The self-updating apparatus of claim 4, wherein the measurement unit comprises test modules configured to hold and subject the items to one or more tests.

8. The self-updating apparatus of claim 4, wherein the updating of central parameters adjusts sensitivity levels of the apparatuses to certain items.

9. The self-updating apparatus of claim 4, wherein the first processing unit is configured to request extra information upon encountering an item or condition that is outside previously encountered parameters and transmit received extra information to one of other apparatuses or the central processing unit.

10. The self-updating apparatus of claim 9, wherein the one of the other apparatuses that receives the updated central parameters modifies its stored internal parameters by using the received updated central parameters.

11. The self-updating apparatus of claim 4, wherein the second processing unit includes an artificial intelligence program.

12. The self-updating apparatus of claim 4, wherein the central processing unit includes an artificial intelligence program.

13. A non-transitory computer-readable storage medium storing instructions for categorizing items or conditions, comprising:
    instructions to receive items and take physical measurements of the items;
    instructions to store parameters in a first memory, wherein the parameters are useful for categorizing the items based on the physical measurements taken from the items and characteristics calculated using the physical measurements;
    instructions to automatically select a source from which to receive new parameters, wherein the first processing module selects the new parameters to receive based on similarity between physical measurements taken by the first processing unit and physical measurements that were taken by the sources;

instructions to automatically modify at least some of the parameters that are stored in the first memory with the new parameters received from the source and with measurements taken by the first processing unit to generate modified parameters; and instructions to transmit a subset of the modified parameters to one or more recipients, wherein at least one of the sources and the recipients includes a measurement unit configured to receive items and take physical measurements of the items, a second memory to store parameters, and a processing module that automatically selects a source from which to receive a different set of parameters and modify at least some of the parameters that are stored in the second memory with the different parameters.

14. The non-transitory computer-readable storage medium of claim 13, wherein the instructions to automatically select a source comprise instructions to compare between the parameters stored in the first memory and parameters stored in the source, and the instructions to transmit to one or more recipients comprise instructions to compare between the parameters stored in the first memory and parameters stored in the one or more recipients.

15. The non-transitory computer-readable storage medium of claim 13, wherein instructions to automatically modify the parameters includes instructions to adjust the sensitivity levels of the parameters used to categorize the items or conditions.

16. The non-transitory computer-readable storage medium of claim 13, wherein at least one of the source and the recipients is a central processing unit that is configured to receive subgroups of parameters from the network of apparatuses, generate updated central parameters based on received subgroups of parameters, and send different subsets of the updated central parameters to selected apparatuses of the network of apparatuses.

* * * * *